US012753120B2

(12) United States Patent
Velten et al.

(10) Patent No.: US 12,753,120 B2
(45) Date of Patent: Oct. 6, 2026

(54) USE OF COMB POLYMERS AS INERTING AGENTS FOR NON-SWELLING LAYER-SILICATES

(71) Applicant: SIKA TECHNOLOGY AG, Baar (CH)

(72) Inventors: Ulf Velten, Oetwil an der Limmat (CH); Annette Süssenberger, Zürich (CH); Jürg Weidmann, Winterthur (CH); Lukas Frunz, Dietlikon (CH); Patrick Juilland, Bern (CH)

(73) Assignee: SIKA TECHNOLOGY AG, Baar (CH)

( * ) Notice: Subject to any disclaimer, the term of this patent is extended or adjusted under 35 U.S.C. 154(b) by 978 days.

(21) Appl. No.: 17/636,123

(22) PCT Filed: Sep. 3, 2020

(86) PCT No.: PCT/EP2020/074684
§ 371 (c)(1),
(2) Date: Feb. 17, 2022

(87) PCT Pub. No.: WO2021/043944
PCT Pub. Date: Mar. 11, 2021

(65) Prior Publication Data

US 2022/0388904 A1 Dec. 8, 2022

(30) Foreign Application Priority Data

Sep. 3, 2019 (EP) .................................... 19195210

(51) Int. Cl.
*C04B 24/26* (2006.01)
*C04B 28/04* (2006.01)
*C08F 283/06* (2006.01)

(52) U.S. Cl.
CPC ...... *C04B 24/2694* (2013.01); *C04B 24/2605* (2013.01); *C04B 24/2647* (2013.01); *C04B 28/04* (2013.01); *C08F 283/065* (2013.01)

(58) Field of Classification Search
None
See application file for complete search history.

(56) References Cited

U.S. PATENT DOCUMENTS 9,546,110 B2 1/2017 Kuo et al.
2007/0287794 A1 12/2007 Alain et al.
2014/0066547 A1 3/2014 Schinabeck et al.
2016/0017082 A1* 1/2016 Hampel .............. C08F 290/062 524/5
2016/0362336 A1* 12/2016 Kuo ...................... C04B 24/267
2017/0240476 A1* 8/2017 Baumann ............ C04B 24/2647

FOREIGN PATENT DOCUMENTS

CN 1673162 A 9/2005
DE 10015135 A1 10/2001
EP 1061089 A1 12/2000
EP 1110981 A2 6/2001
EP 1138697 A1 10/2001
EP 1348729 A1 10/2003
EP 2463317 A1 6/2012
WO 9509821 A2 4/1995
WO 9735814 A1 10/1997
WO 2005/090416 A1 9/2005
WO 2010/005117 A1 1/2010
WO 2011/107704 A1 9/2011
WO 2011/121230 A1 10/2011
WO 2013/164471 A1 11/2013
WO 2014/106572 A1 7/2014
WO 2016/096970 A1 6/2016

* cited by examiner

*Primary Examiner* — Robert T Butcher
(74) *Attorney, Agent, or Firm* — Oliff PLC

(57) ABSTRACT

Use of a comb polymer as an inerting agent for non-swelling layer-silicates, the comb polymer including: a) at least one poly(alkylene oxide) side chain-bearing monomer unit M1 without ionic groups, b) optionally at least one cationic monomer unit MC, wherein the molar ratio of the cationic monomer units MC to the side chain-bearing monomer units M1 is equal to or less than 0.1, preferably less than 0.05, c) optionally at least one anionic monomer unit MA, wherein the molar ratio of the anionic monomer units MA to the side chain-bearing monomer units M1 is less than 1, preferably equal to or less than 0.5, and c) optionally at least one non-ionic monomer unit M3, wherein the molar ratio of the non-ionic monomer units M3 to the side chain-bearing monomer units M1 is less than 7, preferably equal to or less than 3.

16 Claims, No Drawings

USE OF COMB POLYMERS AS INERTING AGENTS FOR NON-SWELLING LAYER-SILICATES

TECHNICAL FIELD

The invention relates to the use of a comb polymer as an inerting agent for non-swelling layer-silicates. Additionally, the invention is concerned with a composition comprising the comb polymer. Further aspects of the invention are related to a method, in particular for plasticizing a mineral binder composition.

BACKGROUND ART

Dispersants or superplasticizers are used in the building industry as plasticizers or water-reducing agents for mineral binder compositions, such as for example concrete, cement mortar, plaster or lime mortar. The dispersants are generally organic polymers which are added to the mixing water or admixed with the binder compositions in solid form. In this way, it is advantageously possible to alter both the consistency of the binder composition during processing and the properties in the hardened state.

Known particularly effective dispersants are, for example, polymers based on polycarboxylate ethers (PCE). Polymers of this kind have a polymer backbone and side chains bonded thereto. Corresponding polymers are described, for example, in EP 1 138 697 A1 (Sika AG).

For the production of building materials sands are being used as an aggregate. Nowadays, mostly natural sands, which are quarried from e.g. rivers, or manufactured sands, which are produced by crushing of rocks, are being used.

However, high-quality river sands are increasingly becoming a scarce resource. Thus, more low-quality sands have to be used comprising either an unfavorable mineral composition due to the weathering of minerals and formation of secondary alteration products typically found in natural sands, or due to an unfavorable mineralogy of the source rock, typically found in manufactured sands.

Unfortunately, the presence of certain contaminants or constituents of sands, such as e.g. non-swelling layer-silicates, has a huge impact on the effectiveness of PCE-based admixtures in mortar or concrete production.

This is because PCEs can be absorbed onto surfaces of non-swelling layer-silicates and, thus, a significant proportion of the added PCEs is lost and cannot adsorb anymore onto cement or cement hydrates so that the desired water-reducing effect cannot be achieved. Furthermore, the hydrophilic surfaces of non-swelling layer-silicates may adsorb water and, thus, reduce the water content in concrete or mortar. Consequently, the flowability of mortar or concrete with a given PCE dosage is significantly reduced if non-swelling layer-silicates are present.

Concrete producers are typically addressing this problem either by using a higher PCE dosage to compensate the loss of PCE performance, or by adding special additives being able to reduce or block the influence of layer-silicates. Such blocking additives are frequently also called clay blockers.

Although increasing the PCE dosage is in principle a straightforward solution, it is economically inefficient and can be problematic if the amount of non-swelling layer-silicates is fluctuating. In this case, the concrete producer is constantly forced to monitor the amount of non-swelling layer-silicates, and subsequently adjust the PCE dosage in order to keep a certain flowability, which is costly and highly time-consuming.

Regarding the so called clay blockers, there are various approaches known nowadays. For example, WO 2010/005117 A1 (W.R. Grace) describes a method in which polycationic compounds in combination with a hydroxycarboxylic acid or a salt thereof is used to enhance slump retention in cements and concretes having clay-bearing aggregates, wherein the clay otherwise absorbs or diminishes the efficiency of polycarboxylate superplasticizers.

WO 2016/096970 A1 (BASF SE) describes a method of inhibiting the swelling of clay in subterranean formations with a polyimidazolium compound. However, polycations, such as polyimidazolium compounds frequently have chlorides as counter-ions which can be problematic in view of possible corrosion of steel reinforcement in concrete. Furthermore, such polycations are usually poorly miscible with standard PCEs.

Finally, WO2011/107704 (Lafarge) discloses an organic molecule with a cationic charge density of less than 0.5 meq/g, preferably a polyvinylalcohol, to offset the adverse effects of non-swelling clays. However, the efficiency of these molecules is limited.

Additionally there are products on the market with clay-blocking properties which are based on a strong water-reducing effect. Products sold by BASF under the brand "MasterSuna" can be mentioned here.

However, these approaches have to be improved regarding effectiveness especially when used in conjunction with non-swelling layer-silicates, robustness toward fluctuations of such non-swelling layer-silicates, compatibility with concrete admixtures and/or lower chloride content.

There is thus a need to develop new and improved solutions which reduce or overcome the aforementioned drawbacks.

DISCLOSURE OF THE INVENTION

It is an objective of the present invention to provide uses, compositions, and methods which allow for reducing or preventing problems with non-swelling layer-silicates in mineral binder compositions. Desirably, the uses, compositions or methods shall reduce the negative influence of non-swelling layer-silicates on the effectiveness of dispersants, in particular of PCE-based dispersants. Preferably, the duration of action should be as long as possible. Especially, the uses, compositions or methods shall be as effective as possible while having a best possible robustness. Preferably, the uses, compositions or methods as such shall affect the flowability of mineral binder compositions as little as possible. Also, preferably, the uses, compositions and methods should be as insensitive as possible with regard to fluctuating non-swelling layer-silicate contents in mineral binder compositions. Particularly, the uses, compositions or methods shall be compatible with common additives used for producing mineral binder compositions, or with corresponding processes, respectively. Especially, the uses, compositions or methods shall be compatible with lignosulfonates, gluconates, naphthalenesulfonates, sulfonated naphthalene-formaldehyde condensates, melamine sulfonates, vinyl copolymers, sulfonated vinyl copolymers, and/or polycarboxylates, especially polycarboxylate ethers. In particular, the uses, compositions or methods shall be compatible with PCE-based dispersants. Also, the uses, compositions or methods should have a content of chloride as low as possible or should be substantially free of chloride.

Surprisingly, it has been found that the problem of the invention can be solved by the features of claim 1. Thus, the core of the invention is the use of a comb polymer as an inerting agent for non-swelling layer-silicates, said comb polymer comprising:

a) at least one poly(alkylene oxide) side chain-bearing monomer unit M1 without ionic groups,
b) optionally at least one cationic monomer unit MC, wherein the molar ratio of the cationic monomer units MC to the side chain-bearing monomer units M1 is equal to or less than 0.1, preferably less than 0.05,
c) optionally at least one anionic monomer unit MA, wherein the molar ratio of the anionic monomer units MA to the side chain-bearing monomer units M1 is less than 1, preferably equal to or less than 0.5, and
d) optionally at least one non-ionic monomer unit M3, wherein the molar ratio of the non-ionic monomer units M3 to the side chain-bearing monomer units M1 is less than 7, preferably less than or equal to 3.

As has been shown, the use of the inventive comb polymers allows for a highly efficient reduction of the negative influence of non-swelling layer-silicates on the effectiveness of dispersants, in particular of PCE-based dispersants, in mineral binder compositions containing non-swelling layer-silicates. Thereby, the inventive solution turned out to be highly robust. Furthermore, the comb polymers of the invention only have little effect on the flowability of mineral binder compositions. Specifically, the dosage of the comb polymer according to the invention is rather uncritical, especially if a certain threshold has been reached. Therefore, fluctuating contents of non-swelling layer-silicates in mineral binder compositions are much less of an issue with the inventive comb polymers. Thus, the comb polymers according to the invention can be used as an inerting agent or blocking agent for non-swelling layer-silicates, especially in combination with PCE-based dispersants.

It is a further advantage of the comb polymers of the present invention that they show a much lower retarding effect of a mortar composition when compared to commonly used clay-blocking additives, such as e.g. products from the MasterSuna range.

Specifically, the comb polymers according to the invention typically have a rather high grafting density of poly (alkylene oxide) side chains, which is in particular higher than the grafting density of usual PCE-based dispersants. Without wishing to be bound by theory, it is believed that comb polymers according to the invention are absorbed on the surface of non-swelling layer-silicates and efficiently cover these surfaces.

In view of this theory, single poly(alkylene oxide) side chains, such as e.g. methyl polyethylene glycols, which are not part of a comb polymer structure should as well be good blocking additives. Nevertheless, it was surprisingly found that the comb polymers used according to the invention are much better blocking additives when compared to single poly(alkylene oxide) side chains. Even when using the same or higher dosages of single poly(alkylene oxide) side chains, these single side chains are not able to reduce or prevent intercalation of PCE-based dispersants to the same extent as the inventive comb polymers.

Moreover, the inventive use of comb polymers turned out to be at least as efficient as the use of known blocking additives such as polycations or like known blocking additives having a strong plasticizing effect.

Further aspects of the invention are the subject matter of other independent claims. Especially preferred embodiments of the invention are the subject matter of the dependent claims.

WAYS OF CARRYING OUT THE INVENTION

A first aspect of the invention relates to the use of a comb polymer as an inerting agent for non-swelling layer-silicates, said comb polymer comprising:

a) at least one poly(alkylene oxide) side chain-bearing monomer unit M1 without ionic groups,
b) optionally at least one cationic monomer unit MC, wherein the molar ratio of the cationic monomer units MC to the side chain-bearing monomer units M1 is equal to or less than 0.1, preferably less than 0.05,
c) optionally at least one anionic monomer unit MA, wherein the molar ratio of the anionic monomer units MA to the side chain-bearing monomer units M1 is less than 1, preferably equal to or less than 0.5, and
d) optionally at least one non-ionic monomer unit M3, wherein the molar ratio of the non-ionic monomer units M3 to the side chain-bearing monomer units M1 is less than 7, preferably equal to or less than 3.

Thereby, the monomer units M1, MC, MA and M3 differ from each other chemically and/or structurally. In particular, the at least one non-ionic monomer unit M3 does not comprise poly(alkylene oxide) groups, especially it does not comprise poly(ethylene oxide) groups.

Within the present context, a "polymer" is a substance comprising or consisting of at least 2, especially at least 3, preferably at least 5, polymerized monomer units.

A "comb polymer" is a polymer comprising a polymer backbone and side chains bonded thereto.

Within the present context a "PCE" is a polycarboxylate ether. Polycarboxylate ethers are frequently being used as superplasticizers for mineral binders. PCE are described, for example, in EP 1 138 697 A1. Especially, PCE superplasticizers are structurally different from the comb polymers of the present invention. This is because PCE are designed to have the effect of plastifying a given mineral binder composition, measurable as increased flow, whereas comb polymers of the present invention do not show a plastification. The PCE is thus a superplasticzer or polymer P as described below. This has the advantage that comb polymers of the present invention can be combined with standard PCE without the risk of too strong plastification in case of varying amounts of layer-silicate present.

The term "mineral binder" denotes a binder which reacts in the presence of water in a hydration reaction to form solid hydrates or hydrate phases. This can be, for example, a hydraulic binder, a latent hydraulic binder, and/or a pozzolanic binder. Highly preferred are hydraulic binders. Hydraulic binders can set under water. But it can also be advantageous for the mineral binder to contain other binders in addition to or instead of a hydraulic binder. These are, in particular, latent hydraulic binders and/or pozzolanic binders. Suitable latent hydraulic and/or pozzolanic binders are, e.g., slag, fly ash, silica dust and/or natural pozzolans.

In particular the mineral binder comprises or consists of cement, especially cement of type CEM I, CEM II, CEM III, CEM IV and/or CEM V (according to the standard EN 197-1).

A mineral binder composition is thus a composition comprising at least one mineral binder, especially cement.

In one preferred embodiment, with respect to the overall mineral binder content, the mineral binder contains at least 5 wt.-%, especially at least 20 wt.-%, preferably at least 35 wt.-%, especially at least 65 wt.-%, of hydraulic binder, especially cement, and, optionally, 5 to 95 wt.-%, especially 5 to 65 wt.-%, particularly 15 to 35 wt.-%, of latent hydraulic and/or pozzolanic binder.

The terms "clay-inerting agent", "clay-blocking agent" and "clay blocker" are meant to be agents capable of reducing or inhibiting adverse effects of swellable and/or non-swellable clays on the effectiveness of dispersants, in particular of PCE-based dispersants, in mineral binder compositions.

The term "non-swelling layer-silicates" stands in particular for phyllosilicate minerals which do not expand and/or increase their volume when wetted by aqueous solutions or water. Structurally talking, non-swelling layer-silicates are layered silicate minerals and, more specifically, phyllosilicate minerals based on tetrahedral $MO_4$ sheets ($M=Si^{4+}$, $Al^{3+}$) and octahedral $M(O,OH)_6$ sheets ($M=Al^{3+}$, $Mg^{2+}$, $Fe^{2+/3+}$, $Ca^{2+}$, $Ba^{2+}$, $Mn^{2+/3+/4+}$). They differ from each other by the order of stacking of tetrahedral and octahedral sheets. The elementary units are bound to each other, forming a stack of layers. The bonding is a result of the formation of an interlayer between two elementary units. Substitution of $Si^{4+}$ cations by cations with a charge <+4 within the tetrahedral and/or substitution of usually $Al^{3+}$ cations by cations with a charge ≤+3 within the octahedral sheets leads to charge imbalances which strongly influence the cation exchange capacity of such layered silicates. The non-swellable phyllosilicates can be further divided based on their structural set-up into 1:1 minerals (tetrahedral-octahedral), e.g. kaolinite, serpentine, 2:1 minerals (tetrahedral-octahedral-tetrahedral), e.g. micas, palygorskite, sepiolite, and 2:1:1 minerals (tetrahedral-octahedral-tetrahedral-hydroxide octahedral, with one or both of the octahedral sheets being dominated by $Mg^{2+}$), e.g. chlorite. Interlayer-deficient micas are part of the 2:1 mineral group comprising minerals such as illite, glauconite, celadonite, and phengite. Charge-balanced 2:1 layer-silicates include minerals such as talc or pyrophyllite. The most common non-swelling layer-silicates are neutral minerals, minerals with a high interlayer charge which is greater than 0.6-0.8 per $Si_4O_{10}$ and/or minerals that are part of the 2:1:1 mineral group.

Non-swelling layer-silicates can be formed either due to weathering of minerals, as is the case for e.g. kaolinite and illite, or due to magmatic and/or metamorphic processes, as is the case for e.g. biotite, phengite, and muscovite. The latter group of minerals is mostly found in source rocks, such as e.g. granite or gneiss, from which the manufactured sands are produced. The formation of non-swelling layer-silicates due to weathering of minerals may take place either during the source rock alteration, during the transportation processes, or directly at the depositional site, e.g. river banks. Other non-swelling layer-silicates, which are not explicitly mentioned here, are also encompassed by the term "non-swelling layer-silicates".

Thus, in particular, the comb polymers according to the present invention are used in compositions comprising such non-swelling layer-silicates, especially kaolinite, serpentine, palygorskite, sepiolite, talc, pyrophyllite, chlorites, mica such as muscovite or biotite, interlayer-deficient mica like illite, glauconite, celadonite, and phengite.

The terms "ionic group" or "ionic groups" especially mean groups that, at least at a pH>10, especially at least at a pH>12, are present in negatively charged form or in positively charged form. In the present context, groups present in negatively charged form are called "anionic groups". Groups present in positively charged form are called "cationic groups". Thereby, counter ions which are solely bound by ionic bonding are not to be considered with regard to the charge of the ionic groups.

The terms "cationic monomers" and "cationic monomer units" especially mean monomers or polymerized monomers that, at least at a pH>10, especially at least at a pH>12, are present in positively charged form. Thereby, counter ions which are bound by ionic bonding are not to be considered with regard to the charge of the "cationic monomers" or the "cationic monomer units".

Likewise, the terms "anionic monomers" and "anionic monomer units" especially mean monomers or polymerized monomers that, at least at a pH>10, especially at least at a pH>12, are present in negatively charged form. Also in this case, counter ions which are bound by ionic bonding are not to be considered with regard to the charge of the "anionic monomers" or the "anionic monomer units".

Especially, anionic monomers are monomers comprising anionic groups such as e.g. hydrogen donor groups or acid groups. The anionic groups are more preferably acid groups, for example carboxylic acid, sulfonic acid, phosphoric acid and/or phosphonic acid groups. Preference is given to carboxylic acid groups. The anionic groups or acid groups may also take the form of anions in deprotonated form or of a salt with a counter ion or cation.

Cationic monomers are monomers comprising cationic groups. Thereby, the cationic group is covalently attached to the cationic monomer. It may be a common cationic group which can be attached to organic polymers, in particular an ammonium, sulfonium and/or phosphonium group. The cationic groups may also take the form of a salt with a counter ion or anion.

The cationic group is in particular grafted onto the backbone of the comb polymer. This means that it is not part of the main chain or backbone of the comb polymer. Therefore, it does not connect subunits of the main chain to one another. Thereby it differs, for example, from the condensates of dimethylamine and epichlorohydrin of US 2007287794 A1.

The terms "non-ionic monomers" and "non-ionic monomer units" especially mean monomers or polymerized monomers which do not have any ionic groups, in particular they neither have any anionic groups nor any cationic groups. Especially, the non-ionic monomers, at a pH>10, especially at a pH>12, are present in uncharged form.

Also, the at least one poly(alkylene oxide) side chain-bearing monomer unit M1 does not comprise any ionic groups. Especially, the at least one poly(alkylene oxide) side chain-bearing monomer unit M1 does not comprise any carboxylic acid, sulfonic acid, phosphoric acid, and phosphonic acid groups and/or the at least one poly(alkylene oxide) side chain-bearing monomer unit M1 does not comprise any ammonium, sulfonium and/or phosphonium groups, in particular quaternary ammonium groups.

Especially, the at least one poly(alkylene oxide) side chain-bearing monomer unit M1, at a pH>10, especially at a pH>12, is present in uncharged form.

Especially, the at least one poly(alkylene oxide) side chain-bearing monomer unit M1 is bonded to the polymer backbone via ester, ether, amide and/or imide groups. The at least one poly(alkylene oxide) side chain-bearing monomer unit M1 preferably includes poly(ethylene oxide) side chains, poly(propylene oxide) side chains and/or poly(ethylene oxide/propylene oxide) side chains. In particular, the number average molecular weight of the poly(alkylene oxide) side chains is in the range of 100-10000 g/mol, especially 250-5000 g/mol, preferably 500-3500 g/mol, in particular 900-2500 g/mol, for example 950-1500 g/mol or 1000-1400 g/mol.

Particularly, the side chain-bearing monomer unit M1 includes a structure of the formula I:

(I)

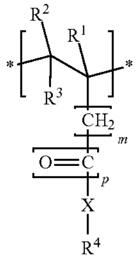

where $R^1$, and $R^2$, in each case independently, are H or an alkyl group having 1 to 5 carbon atoms, preferably H or $CH_3$ or mixtures thereof, $R^3$, in each case independently, is H, an alkyl group having 1 to 5 carbon atoms, preferably H or $CH_3$ or mixtures thereof, or a group with formula $—(CH_2)_m[C{=}O]_p—X—R_4$, m=0, 1 or 2, p=0 or 1, X, in each case independently, is —O— or —NH—, $R^4$ is a group of the formula $-[AO]_n—R^a$ where $A=C_2$- to $C_4$-alkylene, $R^a$ is H, a $C_1$- to $C_{20}$-alkyl group, -cycloalkyl group or -alkylaryl group, and n=2-250, especially 10-200, in particular 15-50 or 20-25.

More particularly, $R^1$=H or $CH_3$ and $R^2$=$R^3$=H.

The X group in monomer units M1, advantageously in at least 75 mol %, particularly in at least 90 mol %, especially in at least 95 mol % or at least 99 mol % of the total number of monomer units M1, is —O— (=oxygen atom).

In a further advantageous embodiment, m=0, p=1 and preferably X=—O—. In this case it is possible to prepare the copolymer on the basis of (meth)acrylic esters which are commercially available.

In another advantageous embodiment, m=0-2, p=0 and preferably X=—O—. Thereby, it is possible to prepare the copolymer on the basis of vinyl ether, (meth)allyl ether or isoprenyl ether monomers which are commercially available.

In a particularly advantageous embodiment, $R^1$ is a mixture of 40-60 mol % of H and 40-60 mol % of $—CH_3$.

The $R^4$ moiety in the side chain-bearing monomer units M1, based on the total number of $R^4$ moieties in the monomer units, in particular consists of a poly(ethylene oxide), especially to an extent of at least 50 mol %, especially at least 75 mol %, preferably at least 95 mol % or at least 99 mol %.

The proportion of ethylene oxide units, based on the total number of alkylene oxide units in the copolymer, is especially more than 75 mol %, especially more than 90 mol %, preferably more than 95 mol % and specifically 100 mol %.

More particularly, $R^4$ has essentially no hydrophobic groups, especially no alkylene oxides having three or more carbon atoms. This especially means that the proportion of alkylene oxides having three or more carbon atoms based on the total number of alkylene oxides is less than 5 mol %, especially less than 2 mol %, preferably less than 1 mol % or less than 0.1 mol %. In particular, there are no alkylene oxides having three or more carbon atoms present, i.e. the proportion thereof is 0 mol %.

$R^a$ is advantageously H and/or a methyl group. Particularly advantageously, $A=C_2$-alkylene and $R^a$ is H or a methyl group.

More particularly, n=10-150, especially n=15-100, preferably n=17-70, specifically n=19-45 or n=20-25. In particular, this achieves excellent blocking effects.

Particular preference is given to copolymers in which $R^1$ is selected from the group consisting of H, $—CH_3$, and mixtures thereof; $R^2$ and $R^3$=H; $R^4$, based on the total number of $R^4$ moieties in the monomer units, consists of a poly(ethylene oxide) especially to an extent of at least 50 mol %, especially at least 75 mol %, preferably at least 95 mol % or at least 99 mol %; and X in at least 75 mol %, particularly in at least 90 mol %, especially in at least 99 mol %, of the total number of monomer units M1 is —O—.

According to a preferred embodiment, the cationic group of the cationic monomer unit MC in the comb polymer includes or consists of an ammonium group, a sulfonium group and/or or a phosphonium group, in particular a quaternary ammonium group.

In a preferred embodiment of the invention, the cationic group is an ammonium group. Particularly preferably it is a quaternary ammonium group. In this case, a positively charged nitrogen atom is substituted with four organic groups Preferably, the cationic group has formula $—N^+ R^{10}R^{11}R^{12}$, wherein $R^{10}$, $R^{11}$ and $R^{12}$ are independently of one another H, an aliphatic hydrocarbon moiety having 1 to 20 C atoms, a cycloaliphatic hydrocarbon moiety having 5 to 8 C atoms and/or an aryl moiety having 6 to 14 C atoms. As indicated by the hyphen, the positively charged nitrogen atom in the group of 12 formula $—N^+ R^{10}R^{11}R^{12}$ is chemically or covalently bonded, optionally via a chemical linker group, to the cationic monomer. Preferably, $R^{10}$, $R^{11}$ and $R^{12}$ are not H, particularly preferably selected from methyl and ethyl.

Especially, the cationic monomer unit MC in the polymer includes or consists of a cationic monomer which has a structure of the formula II:

(II)

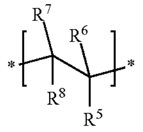

where $R^5$, in each case independently, is $-[D]_d-[E]_e—F$, with

D=—(COO)— and/or —(CONH)—,

E=an alkylene group having 1 to 5 carbon atoms, $F=—N^+ R^{10}R^{11}R^{12}$, $—S^+ R^{10}R^{11}R^{12}$, and/or $—P^+ R^{10}R^{11}R^{12}$, wherein $R^{10}$, $R^{11}$ and $R^{12}$ are independently of one another H, an aliphatic hydrocarbon moiety having 1 to 20 C atoms, a cycloaliphatic hydrocarbon moiety having 5 to 8 C atoms and/or an aryl moiety having 6 to 14 C atoms;

whereby d=0 or 1, e=0 or 1, $R^6$, $R^7$ and $R^8$, in each case independently, are H or an alkyl group having 1 to 5 carbon atoms.

Thereby, preferably, $R^6$=H or $CH_3$, $R^7$=$R^8$=H, d=1 and, especially D=—(COO)—.

According to a preferred embodiment, $F=—N^+ R^{10}R^{11}R^{12}$, e=1 and, preferably E=an alkylene group having 2 to 3 carbon atoms.

In a preferred embodiment of the invention, the ionic monomer is selected from [2-(acryloyloxy)-ethyl]trimethylammonium chloride, [2-(acryloylamino)-ethyl]trimethylammonium chloride, [2-(acryloyloxy)-ethyl]trimethy-lammoniummethosulfate, [2-(methacryloyloxy)-ethyl] trimethylammonium chloride or methosulfate, [3-(acryloylamino)-propyl]trimethylammonium chloride, [3-(methacryloylamino)-propyl]trimethylammonium chloride.

Particularly advantageous according to the invention proved to be the use of [2-(methacryloyloxy)-ethyl]trimethylammonium salts, in particular the chloride. The use is commercially available from Evonik Industries, DE (under the brand name “Visiomer TMAEMC”) or from Sigma-Aldrich, DE.

In a further preferred embodiment, an anionic group of the anionic monomer unit MA in the comb polymer includes or consists of a carboxylic acid, sulfonic acid, phosphoric acid and/or phosphonic acid group.

Preferably, the anionic monomer unit MA in the polymer includes or consists of an anionic monomer which has a structure of the formula III (III)

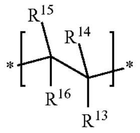

where $R^{13}$, in each case independently, is —COOM, —$SO_2$-OM, —O—$PO(OM)_2$ and/or —$PO(OM)_2$, $R^{14}$ and $R^{15}$, in each case independently, are H or an alkyl group having 1 to 5 carbon atoms, $R^{16}$, in each case independently, are H, —COOM or an alkyl group having 1 to 5 carbon atoms, or where $R^{13}$ forms a ring together with $R^{16}$ to give —CO—O—CO—, M independently from each other is $H^+$, an alkali metal ion, an alkaline earth metal ion, a di- or trivalent metal ion, an ammonium ion and an organic ammonium group.

More particularly, $R^{13}$=COOM, $R^{14}$ ═H or $CH_3$, $R^{15}$═$R^{16}$═H. It is thus possible to prepare the copolymer on the basis of acrylic or methacrylic acid monomers, which is of interest from an economic point of view.

Likewise advantageously, $R^{13}$=COOM, $R^{14}$═H, $R^{15}$═H and $R^{16}$=COOM. Corresponding comb polymers can be prepared on the basis of maleic acid monomers.

It may further be advantageous if the comb polymer comprises at least one further non-ionic monomer unit M3 which especially differs chemically and/or structurally from the monomer units M1, MC and MA. In particular, multiple different further monomer units M3 may be present. In this way, it is possible to further modify the properties of the comb polymer and to adjust them, for example, with regard to specific applications.

Particularly advantageously, the non-ionic monomer unit M3 a monomer unit of the formula IV:

(IV)

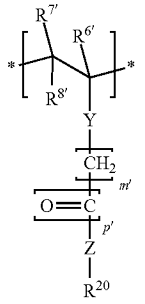

where $R^{6\square}$, $R^{7\square}$, $R^{8\square}$, m□and p□are the same as defined for $R^6$, $R^7$, $R^8$, m and p as described above in the context of the copolymer;

Y, in each case independently, is a chemical bond or —O—;

Z, in each case independently, is absent, is a chemical bond, —O— or —NH—;

$R^{20}$, in each case independently, is an alkyl group, cycloalkyl group, alkylaryl group, aryl group, hydroxyalkyl group or acetoxyalkyl group, each having 1-20 carbon atoms.

Advantageous examples of non-ionic monomer units M3 are those where m□=0, p□=0, Z is absent and Y represent a chemical bond and $R^{20}$ is an alkylaryl group having 6-10 carbon atoms.

Also suitable are especially further monomer units M3 where m□=0, p□=1, Y is —O—, Z represents a chemical bond and $R^{20}$ is an alkyl group having 1-4 carbon atoms.

Further suitable are further monomer units M3 where m□=0, p□=1, Y is a chemical bond, Z is —O— and $R^{20}$ is an alkyl group and/or a hydroxyalkyl group having 1-6 carbon atoms.

Particularly advantageously, the non-ionic monomer unit M3 consists of polymerized vinyl acetate, styrene, alkyl (meth)acrylate and/or hydroxyalkyl (meth)acrylate, especially styrene.

According to a preferred embodiment, the comb polymer, with respect to the total number of monomer units present in the comb polymer, comprises 20-100 mol-%, in particular 50-100 mol-%, especially 65-100 mol-%, for example 80-100 mol-% or 95-100 mol-%, of the at least one poly (alkylene oxide) side chain-bearing monomer unit M1.

Especially, a preferred comb polymer, with respect to the total number of monomer units present in the comb polymer, comprises:

a) 95-100 mol-%, especially 97-100 mol-%, particularly or 98-100 mol-%, preferably 99.5 mol-%, of the at least one poly(alkylene oxide) side chain-bearing monomer unit M1, b) 0-1 mol-%, especially 0-0.1 mol-%, preferably 0 mol-%, of the at least one cationic monomer unit MC, c) 0-1 mol-%, especially 0-0.1 mol-%, preferably 0 mol-%, of the at least one anionic monomer unit MA, d) 0-1 mol-%, especially 0-0.1 mol-%, preferably 0 mol-%, of the at least one non-ionic monomer unit M3.

In such or other preferred comb polymers, the molar ratio of the cationic monomer units MC to the side chain-bearing monomer units M1 is equal to or less than 0.1, especially less than or equal to 0.05, in particular less than or equal to 0.01 or 0.

the molar ratio of the anionic monomer units MA to the side chain-bearing monomer units M1 is less than 1, preferably equal to or less than 0.5, especially less than or equal to 0.1, in particular less than or equal to 0.01 or 0.

the molar ratio of the non-ionic monomer units M3 to the side chain-bearing monomer units M1 is less than 7, especially equal to or less than 3, in particular less than or equal to 0.01 or 0.

In particular, the comb polymer, with respect to the total number of monomer units present in the comb polymer, comprises 100 mol-% of the at least one poly(alkylene oxide) side chain-bearing monomer unit M1. In this case, the comb polymer can be a homopolymer of identical side chain-bearing monomeric units M1 or a copolymer of at least two different side chain-bearing monomeric units M1.

Such comb polymers are for example preferred if the comb polymer comprises side chain-bearing monomer units M1 including or consisting of a structure of formula I as shown above wherein parameter p is equal to 1. These are for example poly(alkylene oxide) (meth)acrylate based monomer units M1.

According to another preferred embodiment, the comb polymer essentially consists of the at least one poly(alkylene oxide) side chain-bearing monomer unit M1 and the non-ionic monomer unit M3. In this case the comb polymer is a copolymer based on the at least one side chain-bearing monomeric units M1 and the non-ionic monomer unit M3. Such comb polymers are for example preferred if the comb polymer comprises side chain-bearing monomer units M1 including or consisting of a structure of formula I as shown above wherein parameter p is equal to 0. These are for example poly(alkylene oxide) alkenyl ether-based monomer units M1.

For example, a preferred comb polymer, with respect to the total number of monomer units present in the comb polymer, comprises:

a) 30-70 mol-%, especially 40-60 mol-%, particularly or 40-50 mol-%, of the at least one poly(alkylene oxide) side chain-bearing monomer unit M1, and
b) 0-1 mol-%, especially 0-0.1 mol-%, preferably 0 mol-%, of the at least one cationic monomer unit MC,
c) 0-1 mol-%, especially 0-0.1 mol-%, preferably 0 mol-%, of the at least one anionic monomer unit MA,
d) 30-70 mol-%, especially 40-60 mol-%, particularly or 40-50 mol-%, of the at least one non-ionic monomer unit M3.

In such or other preferred comb polymers, the molar ratio of the cationic monomer units MC to the side chain-bearing monomer units M1 is equal to or less than 0.1, especially less than or equal to 0.05, in particular less than or equal to 0.01 or 0.

the molar ratio of the anionic monomer units MA to the side chain-bearing monomer units M1 is less than 1, preferably equal to or less than 0.5, especially less than or equal to 0.1, in particular less than or equal to 0.01 or 0.

the molar ratio of the non-ionic monomer units M3 to the side chain-bearing monomer units M1 is 0.1-7, especially 0.5-5, in particular 0.8-3 or 1-2.

In an especially preferred embodiment, the comb polymer is a block copolymer, whereby at least 75 mol-%, especially at least 90 mol-%, preferably at least 99 mol-%, of the total number of at least one side chain-bearing monomer units M1 are arranged in a first block of the block copolymer.

In particular, the block copolymer comprises a second block in which at least 75 mol-%, especially at least 90 mol-%, preferably at least 99 mol-%, of the total number of at least one cationic monomer units MC are arranged.

In a further preferred embodiment, between the first block and the second block, there is a third block comprising at least one side chain-bearing monomer unit M1, at least one cationic monomer unit MC and/or at least one non-ionic monomer unit M3. Especially, the third block has a non-random distribution of the monomer units M1 and/or the cationic monomer units MC in a direction along the polymer backbone.

A "non-random distribution" is understood in the present case to mean a non-statistical distribution of the monomer units M1 and/or the monomer units MC. This means that the side chain-bearing monomer units M1 and/or the ionic units MC are arranged in the third block, for example, in an alternating manner and/or in a gradient structure.

The structure of the copolymers can be analyzed and determined, for example, by nuclear magnetic resonance spectroscopy (NMR spectroscopy). By $^{13}C$ and $^{1}H$ NMR spectroscopy in particular, the sequence of the monomer units in the copolymer can be determined on the basis of neighboring group effects in the copolymer and by using statistical evaluations.

In all of the structures described above, non-ionic monomer units M3 may be added, for example in order to control the density of the other monomeric units in the comb polymer and/or in order to adjust the comb polymer for specific needs.

Preferably, if used, the molar proportion of the non-ionic monomer units M3, with respect to the total number of the monomeric units in the comb polymer, is from 0.0001-50 mol-%, in particular 0.0002-30 mol-%, especially 0.001-25 mol-%, advantageously 0.1-10 mol-% or 1-9 mol-%. This is in particular valid for block copolymers.

The comb polymer is especially prepared by free-radical polymerization (FRP), e.g. by conventional free-radical polymerization or by controlled free-radical polymerization (also called living free-radical polymerization). These polymerization techniques are well known to the skilled person. A suitable process for conventional free-radical polymerization is, for example, described in EP 1 110 981.

Thereby, unilaterally ethylenically unsaturated poly(alkylene oxide) side chain-bearing monomer units M1□according to formula V, optionally at least one unilaterally ethylenically unsaturated ionic monomer unit MC□and/or MA□according to formula VI and/or VII and, optionally, at least one unilaterally ethylenically unsaturated non-ionic monomer unit M3□according to formula VIII, are polymerized together such that the molar ratio of the cationic monomer units MC to the side chain-bearing monomer units M1 is equal to or less than 0.1, especially less than 0.05, the molar ratio of the anionic monomer units MA to the side chain-bearing monomer units M1 is less than 1, preferably equal to or less than 0.5, and the molar ratio of the non-ionic monomer units M3 to the side chain-bearing monomer units M1 is less than 7, preferably equal to or less than 3.

(V)

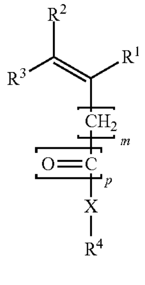

-continued (VI)

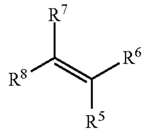

(VII)

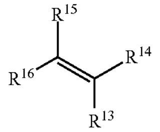

(VIII)

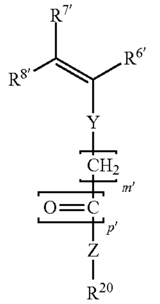

Thereby, $R^1$-$R^{16}$, $R^{6□}$-$R^{8□}$, $R^{20}$, X, Y, Z, m, m□n and p, p□are defined as described above.

Among controlled free-radical polymerization techniques, reversible addition-fragmentation chain-transfer polymerization (RAFT), nitroxide-mediated polymerization (NMP) and/or atom transfer radical polymerization (ATRP) can be used.

In reversible addition-fragmentation chain-transfer polymerization, control over the polymerization is achieved by a reversible chain transfer reaction. Specifically, a growing free-radical chain adds to what is called a RAFT agent, which leads to formation of an intermediate free radical. The RAFT agent then fragments, in such a way as to reform another RAFT agent and a free radical available for propagation. In this way, the probability of propagation is distributed uniformly over all chains. The average chain length of the polymer formed is proportional to the RAFT agent concentration and to the reaction conversion. RAFT agents used are especially organic sulfur compounds. Particularly suitable are dithioesters, dithiocarbamates, trithiocarbonates and/or xanthates. The polymerization can be initiated in a conventional manner by means of initiators or thermal self-initiation.

In nitroxide-mediated polymerization, nitroxides react reversibly with the active chain end to form what is called a dormant species. The equilibrium between active and inactive chain ends is strongly to the side of the dormant species, which means that the concentration of active species is very low. The probability of two active chains meeting and terminating is thus minimized. An example of a suitable NMP agent is the substance with Chemical Abstract number 654636-62-1, commercially available e.g. under the tradename “Blockbuilder MA”.

In atom transfer radical polymerization (ATRP), the concentration of free radicals is lowered by addition of a transition metal complex and a controlling agent (halogen-based) to such an extent that chain termination reactions, such as disproportionation or recombination, are very substantially suppressed.

In the present context, reversible addition-fragmentation chain-transfer polymerization (RAFT) has been found to be particularly preferable, especially if block copolymers are to be produced.

The initiator used for the polymerization is more preferably an azo compound and/or a peroxide as free-radical initiator, which is at least one representative selected from the group consisting of dibenzoyl peroxide (DBPO), di-tert-butyl peroxide, diacetyl peroxide, azobisisobutyronitrile (AIBN), α,α'-azodiisobutyramidine dihydrochloride (AAPH) and/or azobisisobutyramidine (AIBA).

If the polymerization is effected in an aqueous solution or in water, α,α'-azodiisobutyramidine dihydrochloride (AAPH) is advantageously used as initiator.

For control of the polymerization, in particular, one or more representatives from the group consisting of dithioesters, dithiocarbamates, trithiocarbonates and/or xanthates are used.

It has additionally been found to be advantageous if the polymerization is effected at least partly, preferably fully, in an aqueous solution.

In a second method known as polymer-analogous reaction, a polycarboxylic acid backbone is synthesized in a first step. Subsequently, side chains are attached to the polycarboxylic acid backbone, for example by esterification, amidation or etherisation reactions with alcohols, amines and the like. Such polymer-analogous reactions, as well as resulting copolymers, are described, for example, in WO 97/35814, WO 95/09821, DE 100 15 135 A1, EP 1 138 697 A1, EP 1 348 729 A1 and WO 2005/090416. Details about the polymer-analogous reaction are disclosed, for example, in EP 1 138 697 B1 on page 7, line 20 to page 8, line 50, as well as in its Examples, or in EP 1 061 089 B1 on page 4, line 54 to page 5, line 38 as well as in its Examples.

For formation of copolymers having block and/or gradient structures, unilaterally ethylenically unsaturated poly(alkylene oxide) side chain-bearing monomer units M1□and ethylenically unsaturated ionic monomer units MC□and/or MA□and/or the ethylenically unsaturated non-ionic monomer units M3□are preferably at least partly added at different times.

In a further preferred embodiment, in the polymerization, in a first step a), a portion of the monomer units M1□is converted or polymerized and, after reaching a predetermined conversion, in a second step b), the as yet unconverted monomer units M1□(present) are polymerized together with ionic monomer unit MC□and/or MA□and/or the non-ionic monomer unit M3□Step a) is especially effected essentially in the absence of ionic monomer units MC□and/or MA□and M3□.

In this way, in a simple and inexpensive manner, a copolymer having a section consisting essentially of polymerized monomer units M1□followed by a section having a gradient structure can be produced.

It is advantageous here to conduct steps a) and b) in immediate succession. In this way, it is possible to maintain the polymerization reaction in steps a) and b) to the best possible degree.

The polymerization in step a) is especially conducted until 0.1-100 mol %, especially 1-95 mol %, preferably 10-90 mol %, in particular 25-85 mol %, especially 60-85 mol % of monomer units M1□have been converted or polymerized.

The conversion of the monomers or the progress of the polymerization can be monitored in a manner known per se, for example, with the aid of liquid chromatography, especially high-performance liquid chromatography (HPLC).

What is meant by the term “plasticizer” in the present context is especially a substance which is capable of improving the flowability of mineral binder compositions, e.g. mortar and/or cement compositions which have been mixed with water, and/or of reducing the water requirement of such compositions. Substances of this kind are also referred to as “superplasticizers”.

More particularly, the plasticizer comprises at least one representative from the group consisting of lignosulfonates, gluconates, naphthalenesulfonates, sulfonated naphthalene-formaldehyde condensates, melamine sulfonates, vinyl copolymers, sulfonated vinyl copolymers, polycarboxylates, especially polycarboxylate ethers, or mixtures thereof.

More particularly, the plasticizer is a polycarboxylate, especially a polycarboxylate ether. It more preferably has a polycarboxylate backbone and polyether side chains, where the polyether side chains are bonded to the polycarboxylate backbone via ester, ether, amide and/or imide groups. More particularly, the polycarboxylate has a random, statistical, blockwise, alternating or gradient-like monomer distribution.

More preferably, the superplasticizer is a polymer P having or consisting of the following substructure units:

a) a molar parts of a substructure unit S1 of the formula X (X)

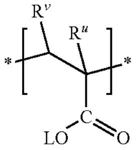

b) b molar parts of a substructure unit S2 of the formula XI (XI)

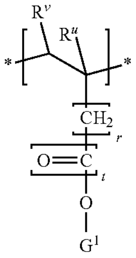

c) c molar parts of a substructure unit S3 of the formula (XII)

(XII)

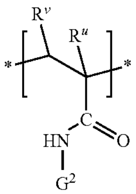

d) d molar parts of a substructure unit S4 of the formula (XIII)

(XIII)

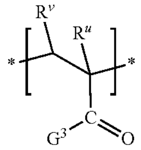

where

L independently represents $H^+$, an alkali metal ion, alkaline earth metal ion, a di- or trivalent metal ion, an ammonium ion or an organic ammonium group, each $R^u$ independently of the others is hydrogen or a methyl group, each $R^v$ independently of the others is hydrogen or COOM, r=0, 1 or 2, t=0 or 1, $G^1$ and $G^2$ is independently a $C_1$- to $C_{20}$-alkyl group, -cycloalkyl group, -alkylaryl group or is $-[AO]_s-G^4$, where A□=$C_2$- to $C_4$-alkylene, $G^4$ is H, a $C_1$- to $C_{20}$-alkyl group, -cycloalkyl group or -alkylaryl group, and s=2-250, $G^3$ is independently $NH_2$, $—NG^5G^6$, $—OG^7NG^8G^9$, where $G^5$ and $G^6$ are independently a $C_1$- to $C_{20}$-alkyl group, -cycloalkyl group, -alkylaryl group or -aryl group, or are a hydroxyalkyl group or are an acetoxyethyl group ($CH_3—CO—O—CH_2—CH_2—$) or a hydroxyisopropyl group ($HO—CH(CH_3)—CH_2—$) or an acetoxyisopropyl group ($CH_3—CO—O—CH(CH_3)—CH_2—$);

or $G^5$ and $G^6$ together form a ring of which the nitrogen is part, in order to construct a morpholine or imidazoline ring;

$G^7$ is a $C_2$-$C_4$-alkylene group, $G^8$ and $G^9$ each independently represent a $C_1$- to $C_{20}$-alkyl group, -cycloalkyl group, -alkylaryl group, -aryl group or a hydroxyalkyl group, and where a, b, c and d represent molar proportions of the respective substructure units S1, S2, S3 and S4, with a/b/c/d=(0.1-0.9)/(0.1-0.9)/(0-0.8)/(0-0.8), especially a/b/c/d=(0.3-0.9)/(0.1-0.7)/(0-0.6)/(0-0.4), preferably a/b/c/d=(0.5-0.8)/(0.2-0.4)/(0.001-0.005)/0 and with the proviso that a+b+c+d=1.

The sequence of the substructure units S1, S2, S3 and S4 may be alternating, blockwise or random. It is also possible that the one or more substructure units S1, S2, S3 and S4 form a gradient structure. In principle, it is also possible that further structural units are present in addition to the substructure units S1, S2, S3 and S4. In particular, the sequences of the substructure units S1, S2, S3 and S4 in the polymer P are random or statistical.

Preferably, the substructure units S1, S2, S3, and S4 together have a proportion of at least 50% by weight, especially at least 90% by weight, most preferably at least 95% by weight, of the total weight of the polymer P.

In the polymer P, $R^v$ especially represents hydrogen and $R^u$ is preferably hydrogen and/or a methyl group.

Preferably, in the polymer P, r=0 and t=1. Also advantageously, r=1-2 and t=0.

More particularly, in the polymer P, $R^v$ is hydrogen, $R^u$ is a methyl group, r=1-2 and t=0.

$G^1$ and/or $G^2$ in the polymer P, in each case independently, are advantageously $-[AO]_s-G^4$ with s=8-200, especially 20-70, and A□is a $C_2$- to $C_4$-alkylene.

In the polymer P, $G^4$, in each case independently, is preferably hydrogen or a methyl group.

Especially, a ratio a/b in polymer P is greater than the ratio of monomeric units MC/M1 and/or a ratio of MA/M1 in the comb polymer described above. In particular the ratio a/b in polymer P is in the range of 1-10, in particular 1.5-5, especially 2-4.

Very particularly advantageous polymers P are those where a) the $R^u$ and $R^v$ moieties are hydrogen,
b) r=0,
c) t=1,
d) $G^1$ and $G^2$, in each case independently, are $-[AO]_s-G^4$ with s=20-70 and A□=$C_2$-alkylene,
e) $G^4$ represents a methyl group and/or
f) a/b/c/d=(0.5-0.8)/(0.2-0.4)/(0.001-0.005)/0

Likewise advantageous polymers P are those where a) t=0 and r=1-2,
b) $G^1$, in each case independently, is $-[AO]_s-G^4$ with s=8-200, especially 20-70,
c) $G^4$ represents hydrogen or a methyl group, especially hydrogen,
d) and/or A□is a $C_2$- to $C_4$-alkylene, especially a $C_2$-alkylene.

A weight-average molecular weight ($M_w$) of the polymer P is particularly in the range of 5000-150000 g/mol, preferably 10000-100000 g/mol, especially 20000-90000 g/mol. The weight-average molecular weight ($M_w$) is determined by gel permeation chromatography (GPC), using polyethylene glycol (PEG) as standard.

The preparation of polymers P is known per se to the person skilled in the art. Corresponding superplasticizers or polymers P are also commercially supplied by Sika Schweiz AG under the ViscoCrete® trade name series.

A further aspect of the present invention is a composition comprising a comb polymer as described above and further comprising a mineral binder, aggregates, a plasticizer and/or non-swelling layer-silicates. Thus, the comb polymer can be present in premixed form together with at least one of these components, or the comb polymer is present in a mineral binder composition mixed with water.

Especially, the composition comprises the comb polymer as described above, a mineral binder, aggregates, and non-swelling layer-silicates. In particular, a plasticizer is present as well. The comb polymer as described above is used in compositions comprising non-swelling layer-silicates selected from the group of 1:1 minerals, 2:1 minerals, and/or 2:1:1 minerals as described above. Thus, in particular, the comb polymer as described above is used in compositions comprising non-swelling layer-silicates selected from the group consisting of kaolinite, serpentine, palygorskite, sepiolite, chlorites, mica such as muscovite or biotite, interlayer-deficient mica like illite, glauconite, celadonite, and phengite, and charge-balanced minerals such as talc and pyrophyllite.

Moreover the present invention is concerned with a method comprising the steps of adding to a composition comprising non-swelling layer-silicates, especially a mineral binder composition comprising non-swelling layer-silicates:

(i) a comb polymer as described above, and
(ii) a plasticizer as described above.

The method as described above is in particular suitable for plasticizing a composition comprising non-swelling layer-silicates, especially a mineral binder composition comprising non-swelling layer-silicates. The method is also suitable for retarding said composition and/or for increasing the compressive strength of said composition.

Preferably, the addition of the comb polymer is effected before the addition of the plasticizer. However, it is for example also possible to add the comb polymer and the plasticizer simultaneously. The plasticizer for mineral binder compositions preferably is a polycarboxylate ether which is chemically and/or structurally different from the comb polymer.

According to a preferred embodiment, the comb polymer of the present invention is added to a composition as described above in an amount of 0.01-10 wt.-%, preferably 0.05-5 wt.-%, more preferably 0.1-2 wt.-%, especially 0.25-1 wt.-%, each relative to the weight of the mineral binder. According to a preferred embodiment, the mineral binder consists of cement. Therefore, according to a preferred embodiment, the comb polymer of the present invention is added to a composition as described above in an amount of 0.01-10 wt.-%, preferably 0.05-5 wt.-%, more preferably 0.1-2 wt.-%, especially 0.25-1 wt.-%, each relative to the weight of cement.

A further aspect of the present invention is related to the use of a comb polymer as described above for reducing or inhibiting adverse effects of non-swelling layer-silicates on the effectiveness of dispersants, in particular of PCE-based dispersants, in mineral binder compositions comprising non-swelling layer-silicates. Thereby, the comb polymer as described above can e.g. be used to increase the flowability and/or the processing time of mineral binder compositions comprising non-swelling layer-silicates and a dispersant, in particular a PCE-based dispersant.

Further advantageous embodiments and combinations of features of the invention will emerge from the following exemplary embodiments and the totality of the patent claims.

EXEMPLARY EMBODIMENTS

1. Preparation Examples of Comb Polymers 1.1 Comb Polymer P1 (Non-Ionic Homopolymer)

For the preparation of a non-ionic homopolymer by means of controlled free radical polymerization, a round-bottom flask equipped with a reflux condenser, stirrer system, thermometer and a gas inlet tube was initially charged with 57.4 g of 50% methoxy polyethylene $glycol_{1000}$ methacrylate (0.027 mol; average molecular weight: 1000 g/mol; appr. 20 ethylene oxide units per molecule) and 18 g of deionized water. The reaction mixture was heated to 80° C. with vigorous stirring. A gentle inert $N_2$ gas stream is passed through the solution during the whole reaction time. 378 mg of 4-cyano-4-(thiobenzoylthio)pentanoic acid (1.35 mmol) were then added to the mixture. Once the substance had fully dissolved, 67 mg of AIBN (0.41 mmol) were added. From then on, the conversion was regularly checked by means of HPLC.

When the conversion, based on methoxy polyethylene glycol methacrylate, had reached 90%, the reaction was stopped. A clear, reddish, aqueous solution was obtained having a solids content of around 40 wt. % which was diluted with water to obtain a solids content of around 30 wt. %. The comb polymer thus obtained is a homopolymer comprising about 20 side chain-bearing monomeric units and is referred to as comb polymer P1.

1.2 Comb Polymer P2 (Non-Ionic Homopolymer)

For the preparation of a non-ionic homopolymer by conventional free radical polymerization, a round-bottom flask equipped with a reflux condenser, stirrer system, thermometer and a gas inlet tube was initially charged with 186 g of deionized water. At a temperature of 100° C., 796 g of 50% methoxy polyethylene glycol$_{1000}$ methacrylate (0.37 mol, average molecular weight: 1000 g/mol; appr. 20 ethylene oxide units per molecule) was added within 180 minutes. Additionally a solution of 4.5 g sodium hypophosphite and 6.7 g of water was added within 175 minutes and a solution of 0.93 g sodium persulfate and 5.0 g water was added within 190 minutes. Once all the solutions were added, the reaction mixture was cooled down. A clear, colorless solution was obtained having a solids content of around 40 wt. % which was diluted with water to obtain a solids content of around 30 wt. %. This polymer is referred to as comb polymer P2.

1.3 Comb Polymer P3 (Non-Ionic Homopolymer)

Non-ionic homopolymer P3 was prepared by conventional free radical polymerization. A round-bottom flask equipped with a reflux condenser, stirrer system, thermometer and a gas inlet tube was initially charged with 8.5 g methallyl-terminated polyethylenglycol (0.0085 mol; average molecular weight: 1000 g/mol; appr. 20 ethylene oxide units per molecule), 2.32 g of 2-hydroxyethylacrylate (0.02 mol), and 18 g of deionized water. The molar ratio of methallyl-terminated polyethylenglycol to 2-hydroxyethylacrylate is thus 1:2.3. The reaction mixture was heated to 80° C. with vigorous stirring. A gentle inert $N_2$ gas stream is passed through the solution during the whole reaction time. 378 mg of 4-cyano-4-(thiobenzoylthio)pentanoic acid (1.35 mmol) were then added to the mixture. Once the substance had fully dissolved, 67 mg of AIBN (0.41 mmol) were added. From then on, the conversion was regularly checked by means of HPLC. When the conversion, based on methallyl-terminated polyethylenglycol, had reached 90%, the reaction was stopped. A clear, reddish, aqueous solution was obtained having a solids content of around 36 wt. % which was diluted with water to obtain a solids content of around 30 wt. %. This polymer is referred to as comb polymer P3.

1.4 Comb Polymer P4 (Non-Ionic Homopolymer)

Comb polymer P4 was prepared in the same way as comb polymer P3 above. The only difference being that the molar ratio of methallyl-terminated polyethylenglycol to 2-hydroxyethylacrylate was 1:1.

1.5 Comb Polymer P5 (Non-Ionic Homopolymer)

Comb polymer P4 was prepared in the same way as comb polymer P3 above. The only difference being that the molar ratio of methallyl-terminated polyethylenglycol to 2-hydroxyethylacrylate was 1:5.

2 Mineral Binder Compositions

The mortar mixture used for test purposes had the dry composition described in Table 1.

TABLE 1

Dry composition of mortar mixture

| Component | Amount [g] |
|---|---|
| Cement (CEM I 42.5N; Normo 4; available from Holcim Schweiz) | 750 g |
| Limestone filler (<125 μm) | 141 g* |
| Sand 0-1 mm | 738 g |
| Sand 1-4 mm | 1107 g |
| Sand 4-8 mm | 1154 g |
| Non-swelling layer-silicates (kaolinite, biotite, illite) | for proportions see tables 3-10 |

*In the following experiments the limestone filler was partly replaced with layer-silicates kaolinite, biotite or illite having particle sizes <125 μm so that the combined content of limestone and layer-silicate in the mortar tests was always 141 g. The amount of kaolinite, biotite or illite used in each experiment are given in below tables 3-10.

The used kaolinite, biotite, and illite were analyzed by XRD (X-ray diffraction) using a Bruker D8 ADVANCE. The samples were analyzed in reflection mode using the following conditions: measuring range between 3 and 65° 2θ, step size: 0.015° 2θ, and time/step: 1.0 s. The quantitative mineral phase analysis is based on the Rietveld method.

The used kaolinite consists of 83% kaolinite, 6% quartz, 9% microcline, and 2% illite. The used illite consists of 57% illite, 32% quartz, 7%, chlorite, and 4% dolomite. The used biotite is a pure mineral phase.

To make a mortar mixture two procedures were followed:

Procedure A: The sands, the limestone filler, the cement and the non-swelling layer-silicates (if added) were dry-mixed in a Hobart mixer for 1 minute. Within 30 seconds, the mixing water (ratio of water to cement w/c is indicated in the tables below) was added and the mixture was mixed for a further 2.5 minutes. The total wet mixing time was 3 minutes in each case. Prior to the addition to the mortar mixture, the respective comb polymer and optionally a PCE-type superplasticizer (Sika® ViscoCrete® 3082; available from Sika, Schweiz) were mixed into the mixing water (for proportions see tables below).

Procedure B (mixing in accordance with EN 480-1): The water is split in 50% wetting water and 50% of rest water. The sands, the limestone filler, the cement and the non-swelling layer-silicates (if added) were dry-mixed in a Hobart mixer for 1 minute. The wetting water was added and after 30 seconds of mixing, the mortar was stored for 2 min in the mixer without stirring (mixer was covered with a foil to avoid water evaporation). Afterwards the mixer was started again, cement was added and after 30 seconds of mixing, the rest water was added and the mixture was mixed for a further 2.5 minutes. Prior to the addition to the mortar mixture, the respective comb polymer and optionally a PCE-type superplasticizer (polymethacrylate partially esterified with polyethyleneglycol (appr. 23 EO units), molar ratio acid:ester groups appr. 1:2) were mixed into the rest water (for proportions see results section).

3 Testing Procedures

To determine the effectiveness of the comb polymers according to the present invention in the mortar mixture, the dispersing effect was determined by measuring the flow table spread (FTS) of a series of mortar mixtures was measured in accordance with EN 1015-3 at different times.

Also, the temperature curve of the mineral binder compositions (mortar mixtures, cement pastes) was recorded as control of hydration and setting behavior, respectively, after mixing. Thereby, the time to onset of the global temperature maximum was determined as a measure of the setting time.

The air content was measured according to EN 12350-7.

In the tests, all of the admixtures (comb polymer and optionally PCE) have been added as aqueous solutions or dispersions with a content of active ingredients of 30 wt.-%. Kaolinite, biotite, and illite were added as a powder.

The dosages of PCEs, comb polymers and non-swelling layer-silicates are given in the following tables 1-8 in wt-% relative to the weight of cement.

4 Results

Table 2 gives an overview of a first series of tests conducted and the results achieved. Mixing procedure B was followed for experiments R1, R2, and E1. Experiments R1 and R2 are experiments conducted for comparative purposes without the addition of a comb polymer according to the invention. Experiment E1 uses the comb polymer P1 which is according to the present invention.

TABLE 2

| (all wt.-% are given with respect to the cement content in the mineral binder composition) | | | |
|---|---|---|---|
| | Experiment | | |
| Components | R1 | R2 | E1 |
| w/c ratio | 0.47 | 0.47 | 0.47 |
| Kaolinite [wt. %] | 0 | 0 | 0 |
| Comb Polymer | 0 | B1 | P1 |
| Proportion [wt.-%] | | 0.5 | 0.5 |
| PCE [wt.-%] | 0.5 | 0 | 0 |
| FTS# [mm] after | | | |
| 0 min | 204 | 238 | 132 |
| 30 min | 195 | 221 | — |
| 60 min | 176 | 194 | — |
| Setting time [h] | 14.8 | 15.3 | 10.2 |

B1 = MasterSuna SBS 3890 (BASF), PCE with ethylenoxide side chains; not according to the present invention
#= flow table spread according to EN 1015-3. The time "0 min" corresponds to the first measurement immediately after the mixing of the mortar sample.

The experiments show the water reduction capabilities of the different comb polymers and the PCE via workability with constant dosage and constant w/c.

The data in Table 2 clearly shows that the inventive comb polymer does not have any significant plasticizing effect when compared to standard PCEs or to commercially available, water reducing clay blockers (i.e. MasterSuna SBS 3890, a PCE with ethylenoxide side chains). The inventive comb polymers also have a significantly lower influence on the setting time, i.e. less retardation, when compared to more conventional comb polymers or to commercially available clay blockers which is advantageous.

Table 3 shows the results of a set of experiments with added kaolinite. Mixing procedure B was followed for experiments R3-R5 and E2. Experiments R3-R5 are experiments conducted for comparative purposes without the addition of a comb polymer according to the invention. Experiment E2 uses a comb polymer according to the present invention.

TABLE 3

| (all wt.-% are given with respect to the cement content in the mineral binder composition) | | | | |
|---|---|---|---|---|
| | Experiment | | | |
| Components | R3 | R4 | R5 | E2 |
| w/c ratio | 0.46 | 0.46 | 0.46 | 0.46 |
| Kaolinite [wt. %] | 0 | 7.5 | 7.5 | 7.5 |
| Comb polymer | 0 | 0 | B1 | P1 |
| Proportion [wt.-%] | | | 0.24 | 0.24 |
| PCE [wt.-%] | 0.5 | 0.5 | 0.5 | 0.5 |
| FTS# [mm] after | | | | |
| 0 min | 200 | 150 | 194 | 196 |
| 30 min | 192 | 130 | 178 | 180 |
| 60 min | 168 | — | 166 | 170 |
| Setting time [h] | 14.2 | 12.7 | 15.3 | 12.3 |

B1 = MasterSuna SBS 3890 (BASF), PCE with ethylenoxide side chains; not according to the present invention
#= flow table spread according to EN 1015-3. The time "0 min" corresponds to the first measurement immediately after the making-up of the mortar sample.

As can be deduced from the results given in Table 3 the addition of kaolinite leads to a reduced flow of the respective mortar composition. The addition of comb polymers B1 and P1 is an effective mean to block the effect of kaolinite on the flow. It can further be seen from the results given in Table 3 that a comb polymer P1, which is according to the present invention, has no retarding effect while the commercial clay blocker B1 shows a strong retarding effect. Comb polymer P1 is thus advantageous.

Table 4 shows the results of a set of experiments with added biotite. Mixing procedure B was followed for experiments R3, R6, and E3. R3 and R6 are experiments conducted for comparative purposes without the addition of a comb polymer according to the invention. Experiment E3 uses a comb polymer according to the present invention.

TABLE 4

| (all wt.-% are given with respect to the cement content in the mineral binder composition) | | | |
|---|---|---|---|
| | Experiment | | |
| Components | R3 | R6 | E3 |
| w/c ratio | 0.46 | 0.46 | 0.46 |
| Biotite [wt. %] | 0 | 5 | 5 |
| Comb polymer | 0 | 0 | P1 |
| Proportion [wt.-%] | | | 0.2 |
| PCE [wt.-%] | 0.5 | 0.5 | 0.5 |
| FTS# [mm] after | | | |
| 0 min | 200 | 146 | 186 |
| Setting time [h] | 14.2 | 12.7 | 12.2 |

#= flow table spread according to EN 1015-3. The time "0 min" corresponds to the first measurement immediately after the making-up of the mortar sample.

As can be deduced from the results given in Table 4 the addition of biotite leads to a reduced flow of the respective mortar composition. The addition of comb polymer P1 is an effective mean to block the effect of biotite on the flow. It can further be seen from the results given in Table 4 that a comb polymer P1, which is according to the present invention, has no retarding effect.

Table 5 shows the results of a set of experiments with added illite. Mixing procedure B was followed for experiments R3, R7, and E4. Experiment R3 and R7 are experiments conducted for comparative purposes without the addition of a comb polymer according to the invention. Experiment E4 uses a comb polymer according to the present invention.

TABLE 5

| (all wt.-% are given with respect to the cement content in the mineral binder composition) | | | |
|---|---|---|---|
| | Experiment | | |
| Components | R3 | R7 | E4 |
| w/c ratio | 0.46 | 0.46 | 0.46 |
| Illite [wt. %] | 0 | 5 | 5 |
| Comb polymer | 0 | 0 | P1 |
| Proportion [wt.-%] | | | 0.2 |
| PCE [wt.-%] | 0.5 | 0.5 | 0.5 |
| FTS# [mm] after | | | |
| 0 min | 200 | 164 | 200 |
| Setting time [h] | 14.2 | 11.8 | 11.5 |

#= flow table spread according to EN 1015-3. The time "0 min" corresponds to the first measurement immediately after the making-up of the mortar sample.

As can be deduced from the results given in Table 5 the addition of illite leads to a reduced flow of the respective mortar composition. The addition of comb polymer P1 is an effective mean to block the effect of illite on the flow. It can further be seen from the results given in Table 5 that the comb polymer P1, which is according to the present invention, has no retarding effect.

Table 6 shows the results of a second set of experiments with added illite. Mixing procedure B was followed for experiments R3, R8, R9, and E5. Experiments R3, R8, and R9 are experiments conducted for comparative purposes without the addition of a comb polymer according to the invention. Experiment E5 uses a comb polymer according to the present invention.

TABLE 6

(all wt.-% are given with respect to the cement content in the mineral binder composition)

| | Experiment | | | |
|---|---|---|---|---|
| Components | R3 | R8 | R9 | E5 |
| w/c ratio | 0.46 | 0.46 | 0.46 | 0.46 |
| Illite [wt. %] | 0 | 10 | 10 | 10 |
| Comb polymer | 0 | 0 | B1 | P1 |
| Proportion [wt.-%] | | | 0.8 | 0.8 |
| PCE [wt.-%] | 0.5 | 0.5 | 0.5 | 0.5 |
| FTS# [mm] after | | | | |
| 0 min | 200 | 128 | 196 | 198 |
| 30 min | | | 173 | 171 |
| 60 min | | | 156 | 148 |
| Setting time [h] | 14.2 | 11 | 15.3 | 12.5 |

B1 = MasterSuna SBS 3890 (BASF), PCE with ethylenoxide side chains; not according to the present invention

#= flow table spread according to EN 1015-3. The time "0 min" corresponds to the first measurement immediately after the making-up of the mortar sample.

As can be deduced from the results given in Table 6 the addition of high amounts of illite leads to a much more reduced flow of the respective mortar composition and, thus, requires higher dosages of comb polymers to offset the effect of illite. The addition of comb polymers B1 or P1 is an effective mean to block the effect of illite on the flow. Again, it can be seen from the results given in Table 6 that a comb polymer P1, which is according to the present invention, has no retarding effect while a commercial clay blocker shows a strong retarding effect. Comb polymer P1 is thus advantageous.

Table 7 shows the results of a set of experiments with added kaolinite in which inventive comb polymers are compared to single MPEG side chain molecules. Mixing procedure A was followed for experiments R10-R14 and E6. Experiments R10-R14 are experiments conducted for comparative purposes without the addition of a comb polymer according to the invention. Experiment E6 uses a comb polymer according to the present invention.

TABLE 7

(all wt.-% are given with respect to the cement content in the mineral binder composition)

| | Experiment | | | | | |
|---|---|---|---|---|---|---|
| Components | R10 | R11 | R12 | R13 | R14 | E6 |
| w/c | 0.48 | 0.48 | 0.48 | 0.48 | 0.48 | 0.48 |
| Kaolinite [wt. %] | 0 | 7.5 | 7.5 | 7.5 | 7.5 | 7.5 |
| Comb polymer | 0 | 0 | 0 | 0 | 0 | P1 |
| Proportion [wt.-%] | | | | | | 0.27 |
| MPEG | 0 | 0 | B2 | B3 | B4 | 0 |
| Proportion [wt.-%] | | | 0.27 | 0.27 | 0.27 | |

TABLE 7-continued (all wt.-% are given with respect to the cement content in the mineral binder composition)

| | Experiment | | | | | |
|---|---|---|---|---|---|---|
| Components | R10 | R11 | R12 | R13 | R14 | E6 |
| PCE [wt.-%] | 0.5 | 0.5 | 0.5 | 0.5 | 0.5 | 0.5 |
| FTS# [mm] after | | | | | | |
| 0 min | 188 | 153 | 154 | 164 | 177 | 190 |
| 30 min | 155 | 140 | 138 | 150 | 153 | 176 |
| 60 min | 152 | 135 | — | 142 | 155 | 170 |

B2 = methoxy polyethylene $glycol_{1000}$ (average molecular weight: 1 000 g/mol)

B3 = methoxy polyethylene $glycol_{3000}$ (average molecular weight: 3 000 g/mol)

B4 = methoxy polyethylene $glycol_{5000}$ (average molecular weight: 5 000 g/mol)

#= flow table spread according to EN 1015-3. The time "0 min" corresponds to the first measurement immediately after the making-up of the mortar sample.

As evident from Table 7, single MPEG side chains are less effective when compared with the inventive comb polymer P1.

Table 8 compares the effectiveness of the inventive comb polymer P1, which was produced via a controlled free-radical polymerization, and the inventive comb polymer P2, which was produced via conventional free-radical polymerization. Mixing procedure B was followed for experiments R3, R15, E7, and E8.

Experiments R3 and R15 are experiments conducted for comparative purposes without the addition of a comb polymer according to the invention. Experiment E7 and E8 uses a comb polymers according to the present invention.

TABLE 8

(all wt.-% are given with respect to the cement content in the mineral binder composition)

| | Experiment | | | |
|---|---|---|---|---|
| Components | R3 | R15 | E7 | E8 |
| w/c ratio | 0.46 | 0.46 | 0.46 | 0.46 |
| Kaolinite [wt. %] | 0 | 7.5 | 7.5 | 7.5 |
| Comb polymer | 0 | 0 | P1 | P2 |
| Proportion [wt.-%] | | | 0.25 | 0.25 |
| PCE [wt.-%] | 0.5 | 0.5 | 0.5 | 0.5 |
| FTS# [mm] after | | | | |
| 0 min | 200 | 152 | 201 | 200 |
| 30 min | 192 | 131 | 176 | 183 |
| 60 min | 168 | — | 164 | 160 |
| Setting time [h] | 14.2 | 12.1 | 12.0 | 12.0 |

#= flow table spread according to EN 1015-3. The time "0 min" corresponds to the first measurement immediately after the making-up of the mortar sample.

It is evident from Table 8 that both inventive polymers P1 and P2, having similar side chain lengths of 1'000 g/mol, show a similar effectiveness in blocking the effect of layer-silicates, although they were produced with different polymerization processes.

Table 9 shows the results of another set of experiments with added kaolinite comparing a comb polymer of the present invention to a polycation type clay blocking additive. Mixing procedure B was followed for experiments R3, R16, R17, and E9. Experiments R3, R16, and R17 are experiments conducted for comparative purposes without the addition of a comb polymer according to the invention. Experiment E9 uses a comb polymer according to the present invention.

TABLE 9

(all wt.-% are given with respect to the cement content in the mineral binder composition)

| | Experiment | | | |
|---|---|---|---|---|
| Components | R3 | R16 | R17 | E9 |
| w/c ratio | 0.46 | 0.46 | 0.46 | 0.46 |
| Kaolinite [wt. %] | 0 | 7.5 | 7.5 | 7.5 |
| Comb polymer | 0 | 0 | B2 | P1 |
| Proportion [wt.-%] | | | 0.25 | 0.25 |
| PCE [wt.-%] | 0.5 | 0.5 | 0.5 | 0.5 |
| FTS# [mm] after | | | | |
| 0 min | 200 | 152 | 193 | 201 |
| 30 min | 192 | 131 | 185 | 176 |
| 60 min | 168 | — | 156 | 164 |
| Setting time [h] | 14.2 | 12.1 | 12.4 | 12.0 |

B2 = Floset EVA 250 L (SNF Floerger), polycation prepared from epichlorhydrine and dimethylamine; not according to the present invention
#= flow table spread according to EN 1015-3. The time "0 min" corresponds to the first measurement immediately after the making-up of the mortar sample.

As can be deduced from the results given in Table 9 the addition of kaolinite leads to a reduced flow of the respective mortar composition. The addition of polycation B2 and P1 is an effective mean to block the effect of kaolinite on the flow and P1 is as efficient as B2 despite of its completely different structure.

Table 10 shows the results of another set of experiments with added kaolinite comparing a comb polymer of the present invention to a polycation type clay blocking additive. Mixing procedure B was followed for experiments R18, R19, and E10-E13. Experiments R18 and R19 are experiments conducted for comparative purposes and not according to the invention. Experiments E10-E13 are according to the present invention.

TABLE 10

(all wt.-% are given with respect to the cement content in the mineral binder composition)

| | Experiment | | | | | |
|---|---|---|---|---|---|---|
| Components | R18 | R19 | E10 | E11 | E12 | E13 |
| w/c ratio | 0.45 | 0.45 | 0.45 | 0.45 | 0.45 | 0.45 |
| Kaolinite [wt. %] | 0 | 7.5 | 7.5 | 7.5 | 7.5 | 7.5 |
| Comb polymer | | | P1 | P3 | P4 | P5 |
| Proportion [wt.-%] | | | 0.7 | 0.7 | 0.7 | 0.7 |
| PCE [wt.-%] | 0.5 | 0.5 | 0.5 | 0.5 | 0.5 | 0.5 |
| FTS# [mm] after | | | | | | |
| 0 min | 195 | 157 | 198 | 203 | 201 | 190 |
| 30 min | 168 | 136 | 179 | 180 | 178 | 157 |
| 60 min | 157 | 118 | 173 | 171 | 162 | 140 |
| Setting time [h] | 11.3 | 11.5 | 12.6 | 13.3 | 13.3 | 14.0 |

#= flow table spread according to EN 1015-3. The time "0 min" corresponds to the first measurement immediately after the making-up of the mortar sample.

As can be seen from the above table 10, the presence of kaolinite strongly reduces the effect of a PCE (compare examples R18 and R19). All polymers P1, P3, P4 and P5 are able to block the effect of kaolinite.

The invention claimed is:

1. A method comprising adding a comb polymer to a mineral binder composition containing non-swelling layer-silicates and a dispersant, the comb polymer being added in an amount effective such that the comb polymer acts as an inerting agent for the non-swelling layer-silicates and improves the effect of the dispersant in the mineral binder composition, wherein the comb polymer, with respect to the total number of monomer units present in the comb polymer, comprises:

a) 30 to 70 mol-% of at least one poly (alkylene oxide) side chain-bearing monomer unit M1, b) 0-1 mol-% of at least one cationic monomer unit MC, c) 0-1 mol-% of at least one anionic monomer unit MA, and d) 30 to 70 mol-% of at least one non-ionic monomer unit M3, wherein at least one of the at least one non-ionic monomer unit M3 differs chemically and/or structurally from the monomer units M1, MC and MA, wherein the comb polymer bas a weight-average molecular weight ($M_w$) in the range of 5,000 to 100,000 g/mol.

2. The method of claim 1, wherein the side chain-bearing monomer unit M1 includes a structure of the formula I (I)

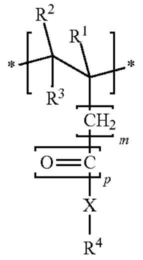

wherein $R^1$, and $R^2$, in each case independently, are H or an alkyl group having 1 to 5 carbon atoms, $R^3$, in each case independently, is H, an alkyl group having 1 to 5 carbon atoms, or mixtures thereof, or a group with formula $-(CH_2)_m-[C{=}O]_p-X-R^4$, m=0, 1 or 2, p=0 or 1, X, in each case independently, is —O— or —NH—, $R^4$ is a group of the formula $-[AO]_n-R^a$ where A=$C_2$- to $C_4$-alkylene, $R^a$ is H, a $C_1$- to $C_{20}$-alkyl group, -cycloalkyl group or -alkylaryl group, and n=2-250.

3. The method of claim 1, wherein the cationic monomer unit MC in the polymer is present and includes a monomer which has a structure of the formula II, (II)

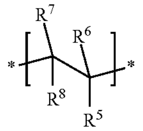

wherein $R^5$, in each case independently, is $-[D]_a-[E]_e-F$, with

D=—(COO)— and/or —(CONH)—,

E=an alkylene group having 1 to 5 carbon atoms,

F=$-N^+R^{10}R^{11}R^{12}$, $-S^+R^{10}R^{11}R^{12}$ and/or $-P^+R^{10}R^{11}R^{12}$, wherein $R^{10}$, $R^{11}$ and $R^{12}$ are independently of one another H, an aliphatic hydrocarbon moiety having 1 to 20 C atoms, a cycloaliphatic hydrocarbon moiety having 5 to 8 C atoms and/or an aryl moiety having 6 to 14 C atoms;

whereby d=0 or 1, e=0 or 1, and $R^6$, $R^7$ and $R^8$, in each case independently, are H or an alkyl group having 1 to 5 carbon atoms.

4. The method of claim 1, wherein the anionic monomer unit MA in the polymer is present and includes a monomer which has a structure of the formula III, (III)

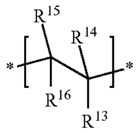

wherein $R^{13}$, in each case independently, is —COOM, —$SO_2$—OM, O—$PO(OM)_2$ and/or —$PO(OM)_2$, $R^{14}$ and $R^{15}$, in each case independently, are H or an alkyl group having 1 to 5 carbon atoms, $R^{16}$, in each case independently, are H, —COOM or an alkyl group having 1 to 5 carbon atoms, or where $R^{13}$ forms a ring together with $R^{16}$ to give-CO—O-CO-, and M independently from each other is $H^+$, an alkali metal ion, an alkaline earth metal ion, a di- or trivalent metal ion, an ammonium ion and an organic ammonium group.

5. The method of claim 1, wherein the non-ionic monomer M3 has a structure of the formula IV, (IV)

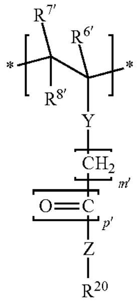

wherein $R^{6'}$, $R^{7'}$, $R^{8'}$, m' and p' are the same as defined for $R^6$, $R^7$, $R^8$, m and p, Y, in each case independently, is a chemical bond or —O—, Z, in each case independently, is a chemical bond, —O— or —NH—, and $R^{20}$, in each case independently, is an alkyl group, cycloalkyl group, alkylaryl group, aryl group, hydroxyalkyl group or acetoxyalkyl group, each having 1-20 carbon atoms.

6. The method of claim 1, wherein the comb polymer is a block polymer, whereby, at least 75 mol-% of the total number of the at least one side chain-bearing monomer units M1 are arranged in a first block of the block copolymer and wherein the block copolymer comprises a second block in which at least 75 mol-% of the total number of the at least one non-ionic monomer units M3 are arranged.

7. The method of claim 1, wherein the amount of the comb polymer added to the mineral binder composition is an amount that is effective for reducing or inhibiting adverse effects of non-swelling layer-silicates on the effectiveness of PCE-based dispersants in the mineral binder composition.

8. A composition made by the method of claim 1.

9. The composition of claim 8, wherein the non-swelling layer silicates are one or more member selected from the group consisting of 1:1 phyllosilicate minerals, 2:1 phyllosilicate minerals, and 2:1:1 phyllosilicate minerals.

10. The composition of claim 8, wherein the composition comprises 0.01-10 wt.-% of the comb polymer relative to the weight of the mineral binder.

11. A method comprising adding (i) a comb polymer, and (ii) a dispersant to a mineral binder composition comprising non-swelling layer-silicates, the comb polymer being added in amount effective for plasticizing the mineral binder composition;

wherein the comb polymer, with respect to the total number of monomer units present in the comb polymer comprises:

a) 30 to 70 mol-% of at least one poly (alkylene oxide) side chain-bearing monomer unit M1, b) 0-1 mol-% of at least one cationic monomer unit MC, c) 0-1 mol-% of at least one anionic monomer unit MA, and d) 30 to 70 mol-% of at least one non-ionic monomer unit M3, wherein at least one of the at least one non-ionic monomer unit M3 differs chemically and/or structurally from the monomer units M1, MC and MA, wherein the comb polymer has a weight-average molecular weight (Mw) in the range of 5,000 to 100,000 g/mol.

12. The method of claim 11, wherein the dispersant for the mineral binder composition is a polycarboxylate ether which is chemically and/or structurally different from the comb polymer.

13. The method of claim 1, wherein the dispersant for the mineral binder composition is a polycarboxylate ether which is chemically and/or structurally different from the comb polymer.

14. The method of claim 7, wherein the amount of the comb polymer added to the mineral binder composition is between 0.01-10 wt %, relative to the weight of the mineral binder.

15. The method of claim 1, wherein the non-swelling layer-silicates are present in an amount of from 5 to 10 wt %, relative to the weight of the mineral binder.

16. The method of claim 1, wherein the non-swelling layer-silicates are selected from the group consisting of kaolinite, biotate and illite.

* * * * *